United States Patent [19]

Leonard et al.

[11] Patent Number: 4,987,550

[45] Date of Patent: Jan. 22, 1991

[54] SELECTIVE PROCESSING OF A DATA STREAM BASED ON FONT FORMAT

[75] Inventors: Anne G. Leonard; Richard L. Verburg, both of Austin, Tex.

[73] Assignee: International Business Machines Corporation, Armonk, N.Y.

[21] Appl. No.: 99,469

[22] Filed: Sep. 22, 1987

[51] Int. Cl.[5] .................... G06F 3/14

[52] U.S. Cl. .................... 364/521; 340/735

[58] Field of Search .................... 364/518, 521, 522; 340/732-735, 747, 750, 799, 744, 749, 748; 400/4, 83; 382/9, 16, 30, 34

[56] References Cited

U.S. PATENT DOCUMENTS

| | | | |
|---|---|---|---|
| 3,803,583 | 4/1974 | Mauber | 340/735 |
| 3,846,763 | 11/1974 | Riikonen . | |
| 3,996,584 | 12/1976 | Plager | 340/735 X |
| 4,031,519 | 6/1977 | Findley | 364/900 |
| 4,124,843 | 11/1978 | Bramson et al. | 340/735 X |
| 4,316,188 | 2/1982 | Cancasci, Jr. | 340/732 X |
| 4,345,245 | 8/1982 | Vella et al. | 340/744 |
| 4,529,978 | 7/1985 | Rupp | 340/735 |
| 4,603,330 | 7/1986 | Horne et al. | 340/735 |
| 4,604,712 | 8/1986 | Orrhammar | 340/732 X |
| 4,654,798 | 3/1987 | Taki et al. | 364/419 |
| 4,661,808 | 4/1987 | Rector et al. | 340/735 |
| 4,686,525 | 8/1987 | Nagata | 340/735 X |
| 4,745,561 | 5/1988 | Hirosawa et al. | 340/735 X |
| 4,813,013 | 3/1989 | Dunn | 340/721 X |
| 4,817,177 | 3/1989 | Stentiford | 382/19 |

FOREIGN PATENT DOCUMENTS

| | | |
|---|---|---|
| 0152040 | 11/1981 | Japan . |
| 0231264 | 11/1985 | Japan . |

OTHER PUBLICATIONS

Heath, A. W., Implied Keyboard Change Character Translating Process, IBM TDB, vol. 28, No. 9, Feb., 1986, pp. 4063-4064.

Littlefield, Richard J., "Using the GLYPH Concept to Create User-Definable Display Formats," National Computer Graphics Association, Jun., 1983, pp. 697-707.

J. L. Gaudet et al., "Code Translation Algorithm", IBM Technical Disclosure Bulletin, vol. 19, No. 6, 11/76, pp. 1963-1964.

*Primary Examiner*—William M. Shoop, Jr.
*Assistant Examiner*—A. Jonathan Wysocki
*Attorney, Agent, or Firm*—Wayne P. Bailey; Marilyn D. Smith

[57] ABSTRACT

The system and method of this invention processes a data stream based on the structure of a font file which can be varied by a user or application of the processing system. The font file not only contains the pel patterns for a range of graphical symbols, but it also contains the rules for interpreting a data stream having a particular syntax. The rules for interpreting a data stream are referred to as the processing model for the data stream. The structure of the font file contains an index array to the range of graphical symbols. Each byte in the data stream is used to generate an index into the index array. In each element of the index array there is a value and control bits. The control bits indicate whether the value is an offset to a graphical symbol or whether the value is a modifier. If the value is a modifier, it is used to increment the next sequential data byte in the data stream through the range of graphical symbols. The modifiers can be used recursively to access an unlimited number of graphical symbols.

32 Claims, 11 Drawing Sheets

| BYTE VALUE | | + Δ | | = ARRAY INDEX | | BIT | ⇒ Δ | GLYPH OFFSET |
|---|---|---|---|---|---|---|---|---|
| N1 | 31 | Ø | | N1 | 81 | 0 | Δ = Ø | OFFSET N1 |
| I | 32 | Ø | | I | 82 | 1 | Δ = Δ + MODIFIER I | n/a |
| N2 | 33 | MODIFIER I | 70 | MM | 83 | 0 | Δ = Ø | OFFSET M |
| N2 | 34 | Ø | | N2 | 84 | 0 | Δ = Ø | OFFSET N2 |

170 15 15

| ビット0~3 \ ビット4~7 | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | NUL | DLE | SP | 0 | @ | P | ` | p | 未定義 | 2バイト・コード文字の1バイト目 | 未定義 | ー | タ | ミ | 2バイト・コード文字の1バイト目 | |
| 1 | SOH | DC1 | ! | 1 | A | Q | a | q | 2バイト・コード文字の1バイト目 | | 。 | ア | チ | ム | | |
| 2 | STX | DC2 | " | 2 | B | R | b | r | | | 「 | イ | ツ | メ | | |
| 3 | ETX | DC3 | # | 3 | C | S | c | s | | | 」 | ウ | テ | モ | | |
| 4 | EOT | DC4 | $ | 4 | D | T | d | t | | | 、 | エ | ト | ヤ | | |
| 5 | ENQ | NAK | % | 5 | E | U | e | u | | | ・ | オ | ナ | ユ | | |
| 6 | ACK | SYN | & | 6 | F | V | f | v | | | ヲ | カ | ニ | ヨ | | |
| 7 | BEL | ETB | ' | 7 | G | W | g | w | | | ァ | キ | ヌ | ラ | | |
| 8 | BS | CAN | ( | 8 | H | X | h | x | | | ィ | ク | ネ | リ | | |
| 9 | HT | EM | ) | 9 | I | Y | i | y | | | ゥ | ケ | ノ | ル | | |
| A | LF | SUB | * | : | J | Z | j | z | | | ェ | コ | ハ | レ | | |
| B | VT | ESC | + | ; | K | [ | k | { | | | ォ | サ | ヒ | ロ | | |
| C | FF | FS | , | < | L | ¥ | l | ¦ | | | ャ | シ | フ | ワ | | |
| D | CR | GS | - | = | M | ] | m | } | | | ュ | ス | ヘ | ン | | 未定義 |
| E | SO | RS | . | > | N | ^ | n | ‾ | | | ョ | セ | ホ | ゛ | | 未定義 |
| F | SI | US | / | ? | O | _ | o | DEL | | | ッ | ソ | マ | ゜ | | 未定義 |

FIG. 7

SELECTIVE PROCESSING OF A DATA STREAM BASED ON FONT FORMAT

BACKGROUND ART

1. Field of the Invention

This invention relates to the presentation of graphic symbols on a display in a data processing system, and more particularly to the means for parsing the data stream that represents the graphic symbols to be displayed.

2. Background Art

In a processing system, such as the IBM RT PC, having a monochrome display, a display manager regulates the output to the monochrome display. The display manager in the processing system interprets the data stream that is sent to the display using a fixed syntax. There is a character generator within the processing system which displays alphanumeric characters on the display according to this fixed syntax. In this type of system, there is no way to either vary the syntax used in interpreting the data stream, or to vary the representation of the displayed. alphanumeric characters created by the character generator. The representation on the display can be changed only by sending a different data stream to the display manager.

Similarly, in all points addressable, APA, displays, the data stream goes into the display manager where it is decoded by the fixed syntax in the display manager. However, after the data stream has been processed in the display manager, it can be displayed in various ways through different interchangeable fonts. The user can specify which font to use to display a data stream. Through these different fonts, a user can display different type styles such as italics or bold, and/or different sizes. Various other displayable aspects can be interchanged, also. At this point, because fonts are being changed, it is possible to change the interpretation of a code point within a given data stream.

For example, if the code point hexadecimal 41 is an "A", which is the way it is defined in the ASCII[1] (American National Standard Code for Information Interchange) standard, in the monochrome display, not only is it displayed as an "A", but it is a specific embodiment of an "A". It is an "A"0 having a certain size, slant, and design. Specific picture elements, pels, are turned on to represent the "A"0 which can't be changed.

[1] Published by American National Standards Institute (ANSI)

Through the use of interchangeable fonts in APA displays, the code point hexadecimal 41 may be varied to be a different design of an "A"0 such as italic, or bold, or different size, etc. Also, by selecting a completely different font, the user can decide that the code point hexadecimal 41 is not an "A"0 at all, but is another graphical symbol.

A data stream is made up of code points which are all certain bit widths. A bit width which can be used in standard ASCII and which will be used in the description of this invention is eight bits, although

[1]Published by American National Standards Institute (ANSI) other bit widths may also be employed such as sixteen bits, thirty-two bits, etc. Each byte that makes up a data stream is referred to as a code point. Because a byte is made up of eight bits, there are 256 code points from 0–255. With these 256 code points, one can express up to 256 different displayable graphical symbols.

The term "graphical symbol"0 includes ordinary alphanumeric characters along with other symbols. Displayable graphical symbols are referred to as "glyphs". An illustration of these 256 codes for a set of graphical symbols is shown in FIG. 1A. However, not all of the 256 codes are used for displayable graphical symbols.

As shown in FIG. 1A, the first thirty-two code points 101–132 in the code page "P0"0 100 are reserved for control codes 15. Control codes 15 are different from graphic codes 17. Some of the control codes that are embedded in the data stream affect the format of the displayable codes on a display or printer output. The control codes listed in the ANSI standard control format parameters such as backspace, horizontal tab, line feed, vertical tab form feed, carriage return, shift out, shift in, and escape, etc. Escape is an important control code since it starts an escape or control sequence which is a multi-byte sequence. An escape specifies the beginning of a longer control sequence which are also defined in an orthodox way by the ANSI standard.

There are also communication controls such as acknowledge, no acknowledge, sync, cancel, start of header, and end of header. Not all control codes are supported by various manufacturers of processing systems. Without knowledge of which code points are control codes, the data stream cannot be adequately interpreted and formatted.

Other control codes are referred to as code page shift controls 115, 116, 129–132 (FIG. 1A). If a processing system has the capability of displaying more than 256 symbols, minus the code points required for control codes, then there is a display symbol range for a processing system. Typically, a full range of displayable symbols are divided into code pages, i.e, ranges of 256 symbols. A code page shifter is then needed to access these different code pages.

A code page is an organization of code points. One code page usually represents one set of 256 code points. For example, a first code page might say that a hexadecimal 41 is an "A". Another code page might say that a hexadecimal 41 is a "%". In the description of this invention, the standard ASCII code pages with some variations will be referenced as shown in FIGS. 1A, 1B, and 1C.

FIGS. 1A, 1B, and 1C represent three code pages. Code points hexadecimal 00 to hexadecimal 1F are control codes in all three of the code pages. This says that these code points are outside the understanding of the code pages. These code points are control points regardless of which code page is being utilized.

A version of the ASCII standard used in the RT PC, called RTASCII, allows for code page shifting. Since more than 256 displayable codes are available, a method was defined to shift into another code page. In the standard RTASCII, the method was to send in the data stream a multi-byte control which would set up a code page "P0"0 100 (FIG. 1A) and a code page "P1"0 150 (FIG. 1B). These escape sequences loaded two different logical slots. For example, for the "G0"0 logical slot, "P0"0 code page would be utilized. For the "G1"0 logical slot, "P1"0 code page would be utilized. Once these code pages were loaded by this multi-byte control, a user could use a Shift In 116 (FIG. 1A) or Shift Out 115 (FIG. 1A) code which are single-byte control codes located in "0E"0 and "0F"0 hexadecimal positions in FIG. 1A. Then, if a Shift Out 115 were used in the data stream, the second code page would be utilized. Subsequent code points would then reference this second code page until a Shift In 116 code returned back to the first code page. This is referred to as a locking shift since the subsequent code points are locked into the next code page until a subsequent shift code is sent.

For example, if code points hexadecimal 61, hexadecimal 62, hexadecimal 63 were sent in a data stream, they would be defined to be in the default code page "P0"0 100 (FIG. 1A) and represented by the graphical symbols "a"0 141, "b"0 142, and "c"0 143, respectively. If a Shift Out code 115 were received, it would be understood to go to the P1 150 (FIG. 1B) code page which would be the next 256 (minus the thirty-two control codes) symbols. If the code points hexadecimal 61, hexadecimal 62, hexadecimal 63 then followed the shift out code 115 in the data stream, the symbols 151, 152, 153 (FIG. 1B) would be represented.

Another method of shifting code pages is called a non-locking shift or single shift. The single shifts are "SS1"0 132, "SS2"0 131, "SS3"0 130, and "SS4"0 129. When these codes are received, only the next eight bits are interpreted in the code page specified. A different code page is accessed for only the next eight bits, and then the original code page is once again used.

In a non-locking shift, generally, only one code page is used most of the time. A second code page is utilized for only one symbol. For example, in text that has an equation, there may be a symbol in the equation that appears in a second code page. This may be the only time that symbol is ever used in the text document. Instead of shifting out of the first code page and into the second code page, and then shifting back into the first code page, it is more efficient to continue the data stream and use the "SS1"0 control code point hexadecimal 1F to get to another range of display symbols. The non-locking shift tells the display manager to look at the next eight bits. Those next eight bits are displayable by the code page defined by "SS1". After this, the display manager goes back to the original code page for the following eight bits.

The single shifts "SS1"0 to "SS4"0 are hexadecimal 1C to hexadecimal 1F. Since hexadecimal 1C to hexadecimal 1F is less than hexadecimal 20, the processing system knows that these are control codes and not displayable codes. When these four single shift codes are used, the display manager knows they are single shift codes. Not only does the display manager know that they are shifter codes, the display manager also knows exactly to where these codes shift. The display manager knows that a certain code will shift the base point 256 or 128 or whatever is needed to another code page. This is what is meant when the syntax knowledge is contained in the display manager.

The locking shift and single shift are the two RTASCII defined methods of getting to more than 256 displayable symbols. With either of these methods, the display manager must recognize the predetermined codes that are being used for code page shifters 115, 116, 129, 130, 131, 132. The display manager examines each byte in the data stream coming in, and if it is a displayable graphic symbol, it displays the graphical symbol according to the font pattern for that code in the font file. The display manager knows both the multibyte control sequences and the various types of single byte controls that cause it to shift to another code page..

For example, if a hexadecimal 1F code is received in the data stream, the display manager knows that the hexadecimal 1F is not displayable since it is a single-byte code page shifter "SS1"0 132 (FIG. 1A). Therefore, the font is not accessed. The display manager stores the fact that there has been a code page shift. The display manager adjusts the base pointer which points to the beginning of the range of the display symbols which will be accessed by the next code point which, for correct processing, should be a graphic code. The next graphic code will be the offset from this base pointer.

A processing system 25 FIG. 2 known in the art is the IBM RT PC. Additional information on the RT PC can be found in *IBM RT Personal Computer: General Information*, Document Number GC23-0783-1. The processing system 25 which runs applications 21 has an operating system 22 such as AIX[2].

Additional information on the AIX operating system can be found in *IBM RT Personal Computer: AIX Operating System Technical Reference,* Document Number SC23-0808-0. The presentation of the display screen 23 is controlled through the display manager 28. The display manager 28 may receive input from the operating system 22, keyboard 26 or application 21 for display to the screen 23.

[2]AIX is a trademark of IBM.

Previously, a processing system 25 was hard-coded, i.e. programmed with executable code, by the manufacturer of the processing system, to represent a processing model for a data stream. The term processing model 18 is used in the art to mean a set of rules that define which bytes in the data stream represent graphical symbols, and which bytes represent a control such as a code page shifter, etc. A processing model 18 essentially allows the processing system to differentiate the graphic codes from control codes for a particular code set. This was typically done in a display manager 28 which made hard-coded assumptions about the data stream that was sent to it.

For example, for a given standard data stream derived from ASCII, such as RTASCII, the hexadecimal codes 1C, 1D, 1E, 1F may be designated as code page shifters. The processing model in the display manager checks each byte in the data stream to see if it is one of these four control codes for page shifting.

If a different standard were used for the data stream, these same four hexadecimal codes might no longer represent control codes for page shifting, or additional codes might be considered to be code page shifters, as well. Therefore the display manager could not use the previous processing model for determining which codes are control codes and which codes are graphical symbols.

For example, the Japanese language is quite complex with over 6,000 graphical symbols. Consequently, more than four page shifters are needed. If there are four shifters, one can bump the base pointer to four different code pages. With over 6,000 displayable codes in 256 units, one needs a lot more shifters to get to the various different 256 units. Therefore, in a version of the Japanese Industrial Standard (JIS) called Shifted-JIS, there are additional control codes which are different from the RTASCII standard in order to support the complexity of that language.

The written Japanese language includes Romaji, the Roman alphabet, Katakana and Hiragana, which are phonetic alphabets, and Kanji, which consists of ideographic forms. Shifted-JIS standards describe the Japanese graphic character set and code pages for the greater than 6,000 graphical symbols used in the written Japanese language. The Shifted-JIS standards are further described in the publications titled "IBM Registry Graphics Characters Sets and Code Pages"0 document number C-H 3-3220-050, and "IBM Japanese Graphic Character Set, KANJI"0 document number C-H 3-3220-024.

The two code page systems, RTASCII and Shifted-JIS are incompatible. They are incompatible because the page shifters are not the same in the different code pages. In the Shifted-JIS code page 170 (FIG. 7), there are control codes 15 where other standard code pages have graphical symbols 17. For example, codes hexadecimal 81 to hexadecimal 9F in Shifted-JIS (FIG. 7) are code page shifters. They are not displayable characters. In RTASCII (FIG. 1A, 1B, 1C), which is used for U.S. and NLS (National Language Support) data streams, those same codes are displayable symbols. Therefore the display manager which understands the syntax of RTASCII would try to display those characters if given the Shifted-JIS data stream. This would result in an error since each one of these languages has a distinct data stream syntax. As a result, the code pages of Shifted-JIS are incompatible with the code pages of FIG. 1A, 1B, and 1C.

One approach is to build a Shifted-JIS processing system that is separate from the RTASCII NLS processing system. Separate processing systems would be needed to understand the different code pages and which different code points in each machine were control code shifters, and to understand how much each code shifter shifted the base pointer.

In order to handle a variety of data stream syntaxes that have different or additional control codes, such as the Japanese Industrial Standard (JIS), or the National Language Support (NLS), the display manager has to be recoded to now check for the newly specified control codes. In other words, a new processing model has to be created. As such, the same hard-coded (programmed) display manager cannot be used for different data streams having different code set representations.

It is known in the art for a manufacturer of a processing system to offer to its customers a processing system that allows a user to select a first or second data stream standard. In this case the manufacturer has programmed the display manager in two ways for two different processing models. If the user selects the first standard, the display manager invokes the first programmed routine representing a first processing model. If the user selects the second standard, the display manager invokes the second programmed routine representing a second processing model.

This approach is limited in its usability. First, the user, i.e. customer, is limited to the data stream standards that the manufacturer has previously chosen, and for which the display manager has been coded to meet the requirements of the specific processing model for the chosen data stream standard. Second, the user can send the data stream for display that uses only one standard or code set at a time. For example, if a first code set had codes hexadecimal 1C to hexadecimal 1F as shift code pages, and a second code set had codes hexadecimal 81 to hexadecimal 9F as shift code pages, the display manager could not intermix the displayable symbols from both of these code sets at the same time.

SUMMARY OF THE INVENTION

It is therefore an object of this invention to adapt one processing model to different data streams having different syntaxes.

It is a further object of this invention to eliminate the need for a manufacturer of a processing system to hard-code the display manager with a processing model of a particular syntax.

It is a further object of this invention to give the user access to code sets and syntaxes not previously provided by the manufacturer of the processing system.

It is a further object of this invention to concurrently display graphical symbols from different code sets.

The processing system of this invention concurrently processes various data streams such as the Japanese Industrial Standard (JIS), ASCII, and National Language Support (NLS) data streams. Instead of having a display manager which, as in the past, provides a specific data stream processing model through executable code as discussed above, the processing of the data streams is a generic processing model directed by respective font files for each of the languages or syntax models. Each font for any data stream is individually structured to incorporate the processing model within each font. In this way, the processing model is implicit in the definition of the font.

Each byte in the data stream is used to generate an index into an index array. In each element of the index array there is a value and a set of control bits. The control bits indicate whether the value is an offset to a graphical symbol or whether the value is a modifier.

More specifically, an index array is used in a font file to specify the processing model of the data stream. The index array contains control bits and a value in each element in the index array. The control bits indicate whether the information is control information or an offset to a displayable graphical symbol. One of the control bits is referred to as an index modifier. If the index modifier bit is on, the value is an index modifier, which is to be applied to the next data byte in the data stream. The index modifier increments the next sequential data byte by a selected amount based upon the desired processing model for a specified data stream. Another control bit is referred to as a base modifier. If the base modifier bit is on, the value is a base modifying value, which is applied to the entire array. By default, and until changed by the data stream, the base modifying value is zero. If all control bits are off, the value is an offset to a graphical symbol, referred to as a glyph, that is to be displayed. Thus, the index array dynamically differentiates control bytes from data bytes in the data stream through the use of the control bits in each element in the index array.

Until an element in the index array is accessed that contains an offset to a graphical symbol, the index modifiers are accumulative. By accumulating index modifiers, the next data byte which is an offset to a graphical symbol can be referenced from any element in the index array. This allows the use of an unlimited number of graphical symbols since the index modifier can be used recursively. Therefore, this allows the combination of the various 256 code sets for ASCII, NLS, and Shifted-JIS, which requires over 6000+ codes.

In addition to containing pel patterns for the graphical symbols to be displayed, the font table contains the processing model with the syntax for interpreting the data stream. Therefore, in addition to the fonts being accessible to a user of the processing system for selecting and changing fonts, the processing model within the font is selectable and changeable by a user, also. By changing the control bits in any element in the font index array, the user can determine whether a byte in a data stream is a modifier to another location in the index or an offset to a graphical symbol. Consequently, a user can create their own graphical symbols and data stream standards, combine together other data stream standards, and create their own processing model to interpret these data streams.

BRIEF DESCRIPTION OF THE DRAWING

FIG. 7 illustrates a Shifted-JIS code page.

DESCRIPTION OF THE PREFERRED EMBODIMENT

Figure 4:
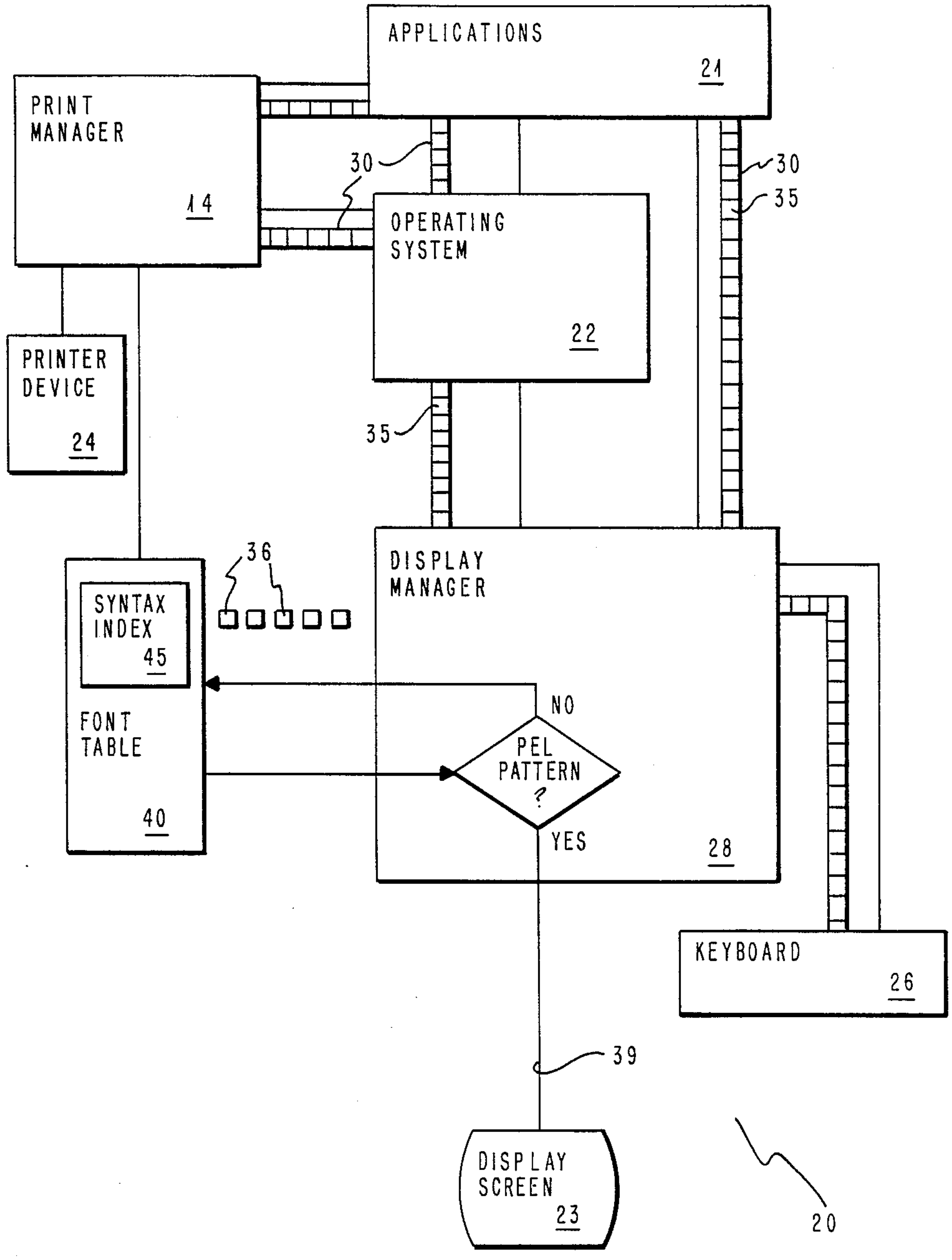
FIG. 4 illustrates the system of this invention.

Referring to FIG. 4, the system of this invention involves a data stream 30, a display manager 28, and a font file 40 having an index array 45. The data stream 30 is made up of bits 35 that represent hexadecimal codes which are sent to the display manager 28. The knowledge to understand what the data stream bits 35 mean has previously been located in the display manager 28. The display manager 28 is an extension of the operating system 22. Typically, the manufacturer of a processing system 20 ships the display manager 28 with the operating system 22 software. The display manager code is written one time by the manufacturer of the software. Therefore, in previous systems as discussed above, the syntax, i.e. the organizing principles used to understand the data stream, are fixed and cannot be changed by a user of the processing system. The syntax is decided by the manufacturer of the processing system during the development of the system architecture.

In the system and method of this invention as shown in FIG. 4, the syntax for a specific data stream is not encoded into a processing model within the display manager 28. The display manager 28 is not required to know which codes in a range of codes are set aside as code page shifters. These code page shifters can be anywhere in the range of codes. This allows one to use the ASCII standard of code pages to display the national language or U.S. data stream while also using the Shifted-JIS code page system to support Japanese-based applications that would want to display Katakana, Hiragana, or Kanji.

Instead, the processing model is incorporated into an index array 45 in the font file 40. The font 40 is used to direct the generic processing model as it translates the data stream 30. The font 40 is used to define what the organized or processed data stream is to mean. The way the input 30 is transposed into output 39 is determined by the syntax or processing directions incorporated within the font file 40 instead of residing in the display manager 28.

When the data stream 30 is sent to the display manager 28, the display manager 28 no longer has enough information about what each element 36 in the data stream means. The display manager 28 then accesses the font file 40 provided by the user. The display manager 28 maps each byte 36 in the data stream 30 to the font file 40. The font file 40 is either a default font file supplied with the processing system 20, operating system 22, or application program 21, or it is supplied by the user. It is the font file 40, and not the display manager 28, that defines whether a code point is a graphic symbol or a code page shifter. If the code point is a code page shifter, i.e., an index modifier or a base modifier, the base offset in the display symbol range is shifted accordingly. The font file tells the display manager 28 whether the data stream element, i.e. byte 36, is a displayable graphic or whether it is a modifier.

The processing system 20 of this invention has removed the knowledge of the syntax from the display manager 28, and moved it into the font file 40. The display manager 28 makes no assumptions about what the data stream 30 means. Therefore, the syntax is not hard-coded; it is not decided once, and it is not fixed. Instead, the display manager refers to a font file 40 which is supplied by the user, by an application program 21, or with the operating system 22.

Although the display manager 28 does not provide a hard-coded processing model of the data stream 30 in this invention, the display manager 28 is still used in this invention. The display manager 28 still accepts input of the data stream 30, but the display manager 28 now processes the input into output 39 as directed by a font file 40. Additionally, the display manager 28 continues to perform its other tasks with the exception of the shifting code pages. All code page shifting is now defined in the font file to get to the various parts of the display symbol range.

Although code page shifting and code pages are referred to in the description of this invention, the present invention actually eliminates the need to divide a range of graphical symbols into pages of 256 codes each, and to shift between these pages. With recursive modifiers, any point within a continuous range of display symbols can be accessed without first dividing the range of symbols into groups, accessing one of the groups, and then accessing a symbol within the one group.

The display manager 28 is still in control of the data stream 30, but refers to the font file 40 since the knowledge to interpret the data stream no longer resides in the display manager 28. The display manager 28 still has to interpret the data stream 30, but it will get the syntax to do this out of the font file 40.

Therefore the font file 40 is used for two purposes. Not only is the font file 40 used to express the form of a graphical symbol to be displayed on the screen, but the font file 40 also supplies the rule for parsing the data stream 30. Once the data stream 30 is parsed, then the graphical symbol 17 to be displayed can be accessed.

The system and method of this invention goes beyond the prior art which allows fonts to be varied and changed by a user or an application. The system of this invention allows the syntax of the data stream 30 to be varied and changed by a user or an application 21. The user or an application 21 is able to change the syntax since the syntax no longer resides in the system software. The syntax is supplied by the user or application 21 in the font 40.

Therefore, a user or application 21 is able to utilize a data stream 30 that only the user or application 21 understands. The user or application 21 is not dependent on the specific way the manufacturer of a processing system had previously hard-coded the system to interpret the data stream 30. Instead, the user or the application 21 will provide the means for understanding its own data stream 30 by individually and independently structuring the index 45 to the font table 40. At the same time, the font 40 will supply the means for displaying the glyphs represented by the data stream 30.

Figure 3:
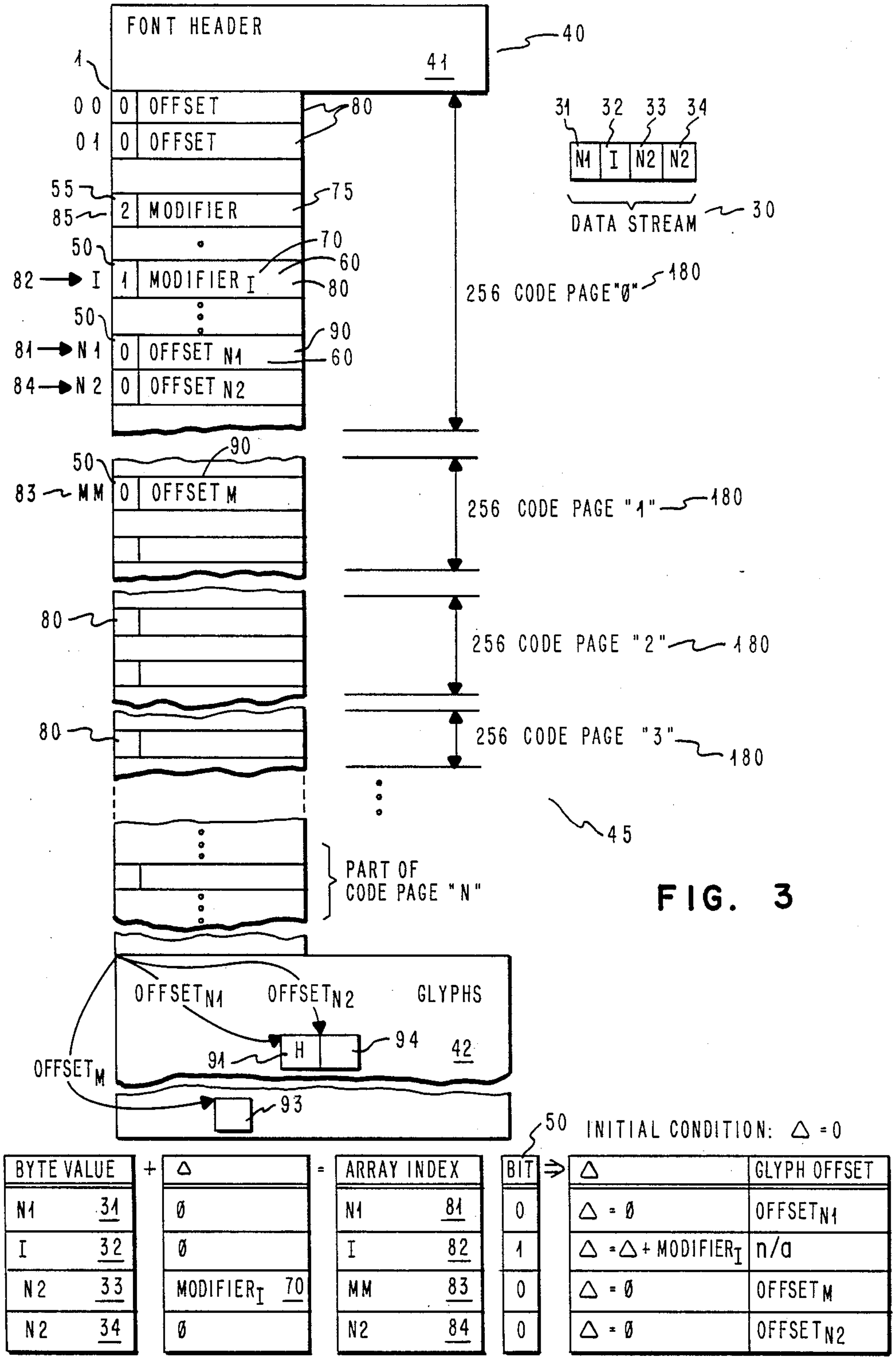
FIG. 3 shows the processing model imbedded in the index array of a font file.

Referring to FIG. 3, the data stream 30 is comprised of elements "N1"0 31,"I"0 32, "N2"0 33, and "N2"0 34 which represent bytes of hexadecimal digits or bits of binary digits. In any form, any element can represent any number from 0 to 255. The font file 40, comprises a font header 41, an array 45, and the actual graphical symbols, glyphs, 42. The array 45 has an entry 80 for each code point in the font logical code pages.

For example, in a font that had three logical code pages, each having 256 codes, there would be 768 entries points 80 in the array 45. For example the first 256 entry points 80 would represent the zero level code page. The second 256 entry points 80 in the array would represent a first level code page. The third 256 entry points 80 would represent a second level code page and so forth for as many code pages or group of 256 codes that were needed to represent all set of 256 codes 180 could represent one of several pages of the same code set, or a different code set standard. For example, some of the sets of 256 codes may represent ASCII, other sets of 256 codes may represent National Language Support, and other sets of 256 codes may represent Japanese Industrial Standard with over 6,000 individual code points. All of these standards, and other standards may be represented together in the array 45.

For each entry 80 in the array 45 there are control bits 50 which are set either on (1) or off (0). The control bits 50 indicate whether the information in that entry 80 of the array 45 is control information or data. There are two types of control bits index modifier bits and base modifier bits. The index modifier bit is mutually exclusive with the base modifier bit. If the control bits 50 are set off, the value 60 is an offset 90 to a graphical symbol in the glyphs 42 that is to be displayed. If the index modifier bit 50 is on, the value 60 is an index modifier 70 which is to be applied to the next data byte 33 in the data stream. Index modifiers 70 are used as page shifters for the following data byte only. If the base modifier bit 55 is on, the value 75 is a base modifier which is to be applied to all data bytes in the subsequent data stream. Base modifiers are used as page shifters for all following data bytes.

Figure 1A:
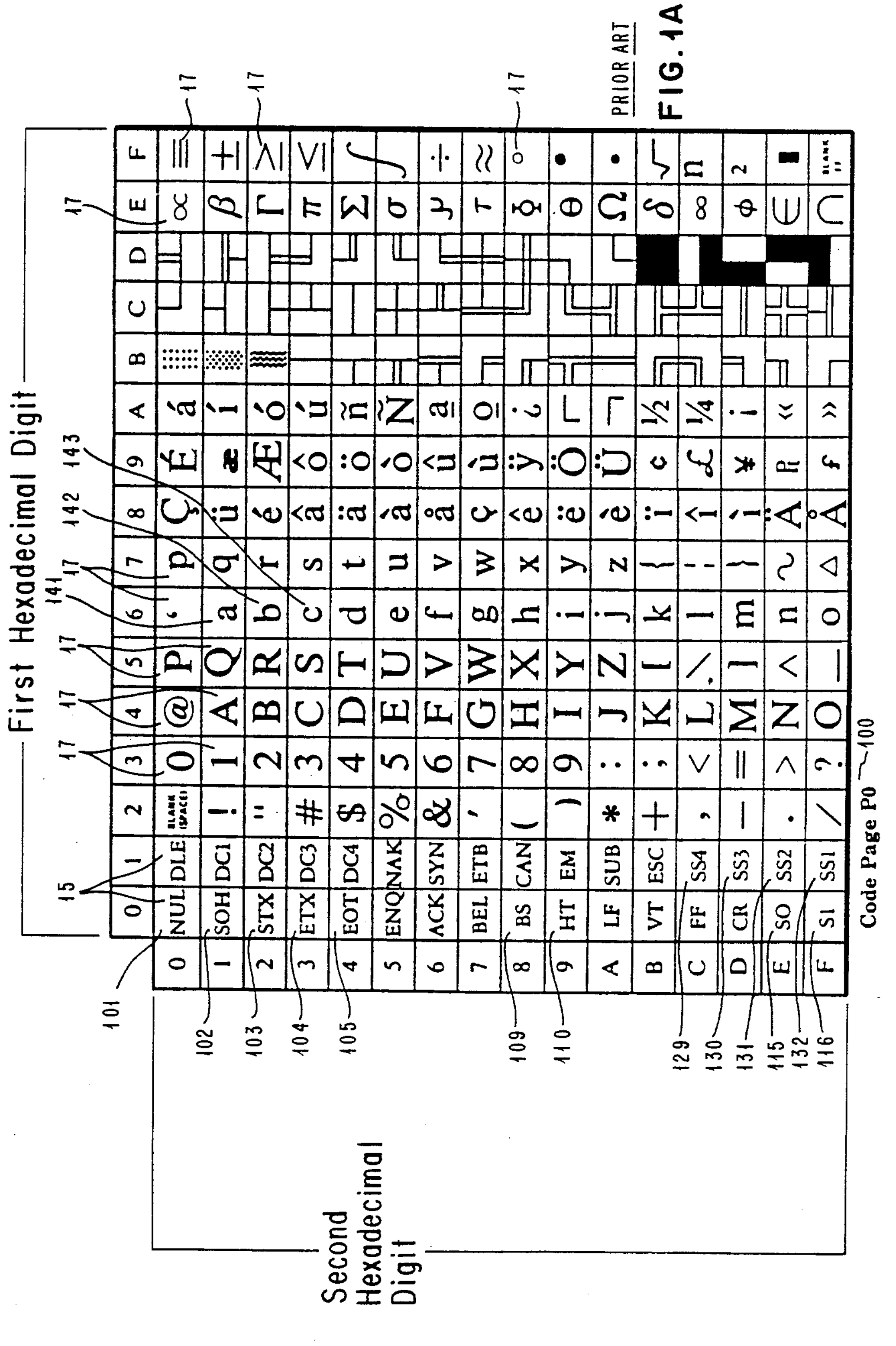
FIG. 1A shows a zero level code page of hexadecimal digits representing graphical symbols, control codes, and page shifter controls.
Figure 1B:
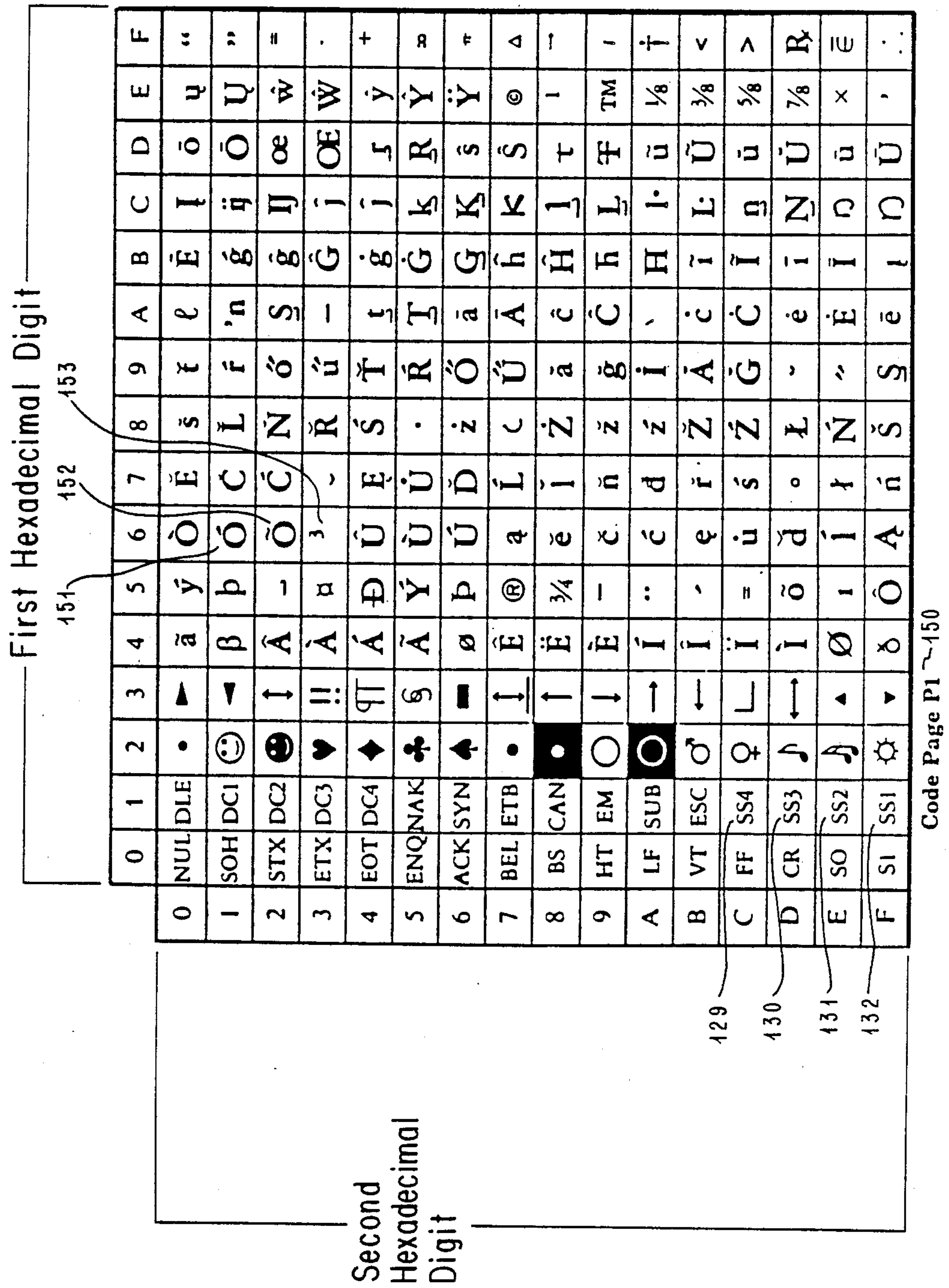
PRIOR ART FIG. 1B
FIG. 1B shows a first level code page of hexadecimal digits representing different graphical symbols than the zero level code page with the same control codes and page shifter controls.
Figure 1C:
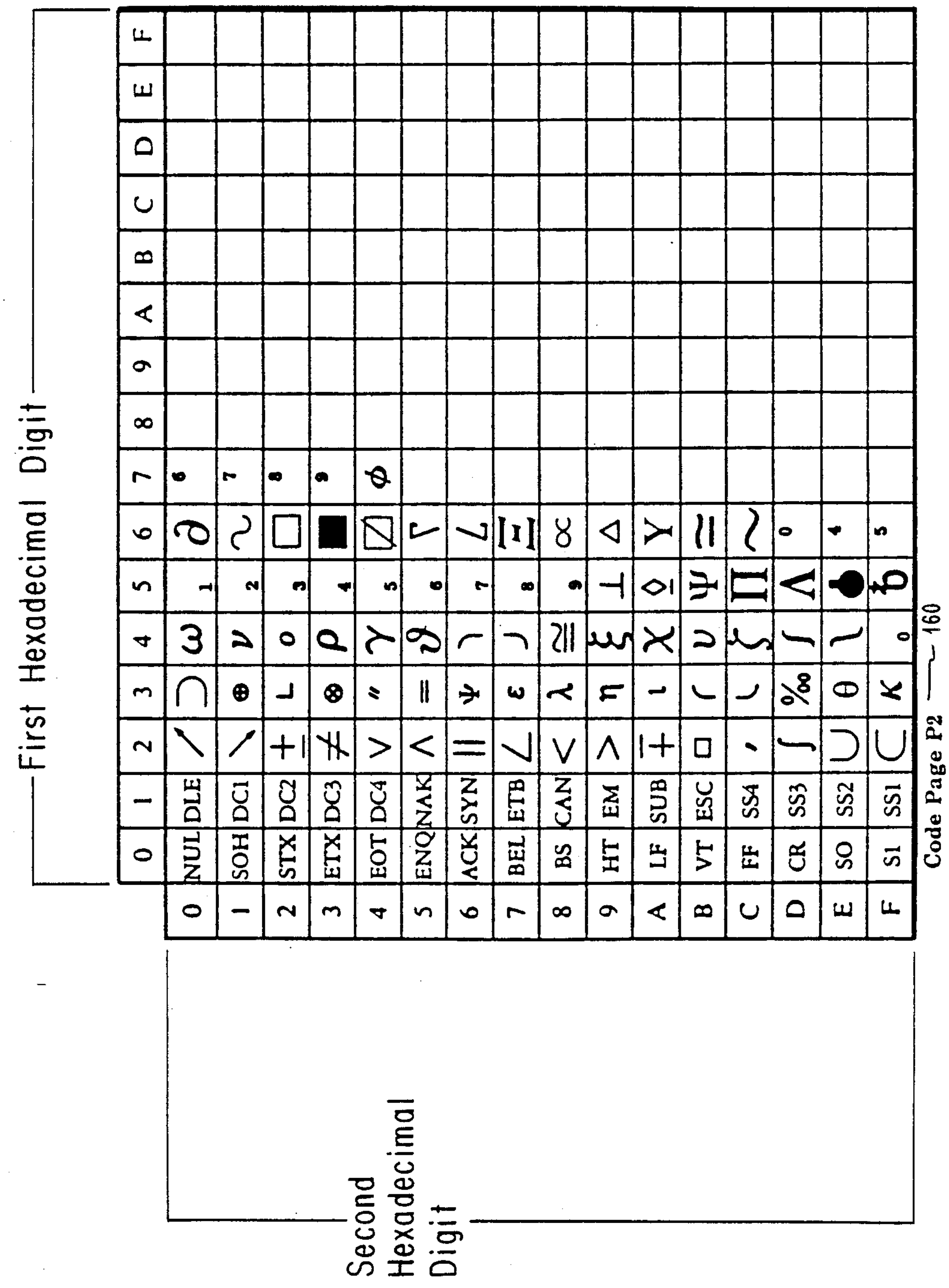
PRIOR ART FIG. 1C
FIG. 1C shows a second level code page of hexadecimal digits representing different graphical symbols than the zero level and first level code page but with the same control codes and page shifter controls.
Figure 2:
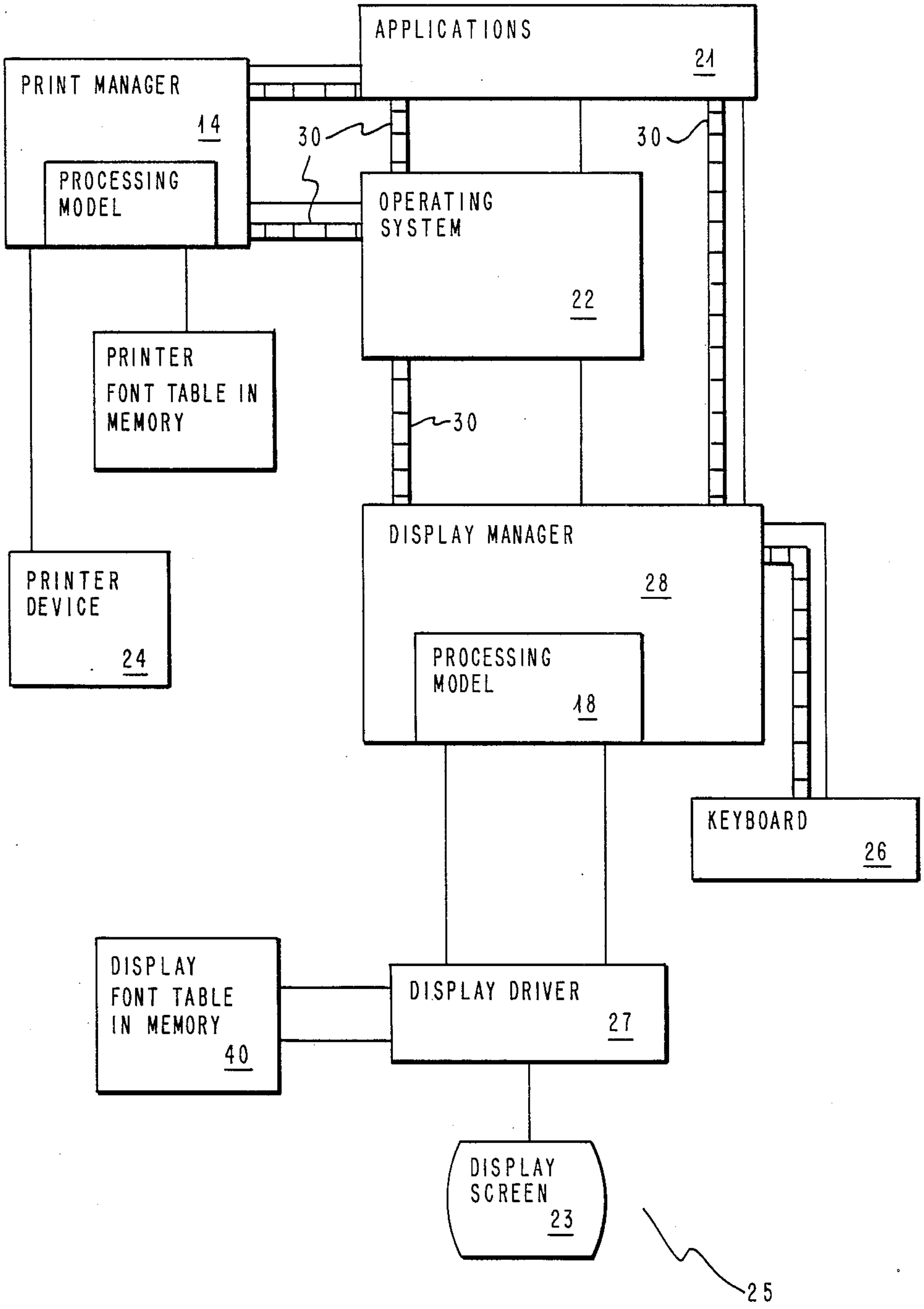
PRIOR ART FIG. 2
FIG. 2 shows a data processing system known in the art with a data stream processing model encoded in the display manager.

When the display manager 28 (FIG. 4) receives the first byte "N1"0 31 in the data stream, the display manager accesses the index 45 of the font file 40 at the "N1"0 element, entry 81, in the array 45. For example, if the "N1"0 byte 31 in the data stream 30 represented the number "73", the entry 81 would be at the 74th position in the array index 45 if the first position were zero. At the "N1"0 entry 81 in the array 45, the control bits 50 are off which indicates that the value 60 is an offset 90 into the glyphs 42. The glyphs 42 are the locations where the actual bit patterns of the graphical symbols are stored for the various fonts. These bit patterns in the glyphs are then sent to the display 23. Using the example above, if the "N1"0 element 31 in the data stream 30 represented the number 72, and the graphical symbols 17 of code page 100 (FIG. 1A) were stored into the glyphs 42, the graphical symbol that would be sent to the display would be an "H".

When the display manager 28 receives the second element "I"0 32 in the data stream 30, the display manager 28 accesses the font array 45 at the "I"0 location 82. In this example, the index modifier bit 50 is set on, which indicates that the value 60 is an index modifier 70 and not a displayable symbol. The index modifier 70 will modify the next byte 33 in the data stream 30. The value 60 in index position "I"0 82 is not displayed. Instead, the index modifier 70 at index position "I"0 82 is used as a reference starting point for the next byte 33 in the data stream 30.

The next byte "N2"0 33 in the data stream 30 is accessed at entry 80 in the array 45 that the element "N2"0 33 represents from the index modifying value 70 at the "I"0 position 82. For example, if "N2"0 33 had the hexadecimal digits "FF"0 which represent the base ten number 255, the display manager 28 would access the font array 45 at 255 array entries 80 from the array entry specified by the index modifier in the "I"0 array element 82. This is shown in FIG. 3 as array entry "MM"0 83 in a succeeding code page 180. Without the modifier 70, the element "N2"0 33 in the data stream would have caused the display manager 28 to access the font array 45 at position "N2"0 84 in the initial code page.

As the element "N2"0 33 in the data stream 30 is shifted to the index entry "MM"0 83, the control bits 50 are off which indicates the value 60 is an offset 90 into the glyphs 42. This shows that the same byte value "N2"0 33 and "N2"0 34 in a data stream 30, results in two different glyphs 93, 94 because of the preceding index modifier 70 on one of the "N2"0 elements 33 of the data stream 30. The above shows the resulting difference when an element in a data stream follows an index modifier 70 and when it does not.

The index modifier 70 in index array position "I"0 82 is effective and accumulative for succeeding elements in the data stream until a displayable symbol in the glyphs 42 is reached. This is indicated when an array entry 80 has its control bits 50 off. Once a displayable symbol in the glyphs 42 is accessed, the starting point for the next element in the data stream 30 reverts back to the last processed base modifier value. If a base modifier has not been processed, then a value of zero is assumed.

The index array 45 is the structure between the font header 41 and the glyphs 42. The index array 45 is the structure where the syntax is embodied and allows code page shifting. The glyphs 42 have no syntax knowledge. The glyphs 42 only contain the information on which pels to turn on. The index array 45 structure translates a code point into a glyph 42 using the syntax model embodied in the index array structure 45.

Therefore, if users wanted to make their own syntax, they would vary the index structure 45 to make the data stream 30 conform to a different processing model. The mechanism to do this is by changing the control bits 50 to either on or off. The control bits 50 indicate whether the byte in the data stream 30 is to be processed as a modifier, or a graphical symbol. If the user just wanted to change the way the characters appeared, instead of changing the structure of the index array 45, the user would modify the glyphs 42 which are the physical representations of the processing model contained in the index array structure.

The index array structure 45 is variable in length depending on the model and the number of graphical symbols that are desired to be represented. Since the index array structure 45 contains offsets into the glyph index 42, it doesn't matter where the glyph index 42 starts.

Instead of building separate processing systems, this invention does not require the display manager to know what the shifter codes are. The shifter codes may be located anywhere. In addition, the display manager does not know the amount of a shift even when there is a shift code.

In order to determine the syntax, the display manager refers to the font file. There is control information in each designation that says whether it is a displayable symbol or a shifter code. If it is a graphically displayable symbol it will point to the bit pattern that should be used to display the pel pattern of the symbol. If it is not a graphically displayable symbol, it is a shift code which indexes another entry in the array. The next code is added to the shift code to get to a new entry in the array. This entry in the array still may not be a graphically displayable symbol. It may also be a shifter to which the next code is added, and so forth. Conceivably, one may have a repetitive number of jumps until a displayable code is reached.

In a previous technique there were only certain code points that were base shifters. Those were typically the hexadecimal 1C to hexadecimal 1F of the single non-locking shift. The hexadecimal 0E and hexadecimal 0F are the Shift Out and Shift In control codes of the locking shifts. These are known before hand and defined by a code page itself. In this invention, there is no predetermined differentiation between shifters and graphical offsets. The display manager does not presuppose any code point in the data stream to be a control code shifter of a displayable graphical symbol. Also, in the previous system and methods, the offsets into the display symbol range are known. Also, in the previous systems and methods, there is only one level of indirection. One gets a code page shifter which alters the base pointer into the display symbol range. The next code point is expected to be a displayable graphical symbol. If two shifters were sent together, the first shifter would have been disregarded as a mistake. Previously, shifters could not be accumulated. The last known shifter would be taken to which the graphic display code point would be added. In this invention, there are unlimited levels of indirection. Every time a font file is referenced with a code point it is determined whether the code point is a shifter or an offset to a graphical displayable symbol. If it is a shifter, the shifter indexes to another place in the index array which itself might be another shifter. This creates the possibility of an accumulative effect which allows as many levels of indirection as desired.

Also, in the previous systems and methods, there was a fixed processing model. There was only one model possible at any given time to interpret a data stream. Multiple processing models could exist if an application program chose which model would be used to process a given data stream. These multiple models would be fixed in time, such that new and different models could not be implemented without rewriting the code in the display manager. Also, any model that did exist was determined by a software architect with possible reference to a standards committee.

In this invention, the variable processing model allows multiple processing models concurrently. The user (or an application) instructs the display manager which font file to use. The user defines a font file pointer to the display manager. As a result, the font file can be dynamically redefined by a user. An application can point to different font files. Each font file can be structured so as to embody a different standard or syntax. Users can define their own non-standard syntax. There is no need to adhere to any of the predetermined standards in the industry.

Font files could be provided such that if a user wanted to use Shifted-JIS, the user could point to the Shifted-JIS font file. However, if the user wanted to make their own syntax not typically supported in a manufacturer's processing system, the user could create his own font file.

The two sets 210, 220 of graphical symbols representing the same sentence in two different languages shown in FIG. 5 are produced by non-compatible data stream models, a version of ASCII used by the RT PC called RTASCII, and Shifted-JIS. The English sentence 210 was produced by the stream of hexadecimal numbers 211 as shown in FIG. 5B. The Japanese sentence 220, which is semantically equivalent to the English sentence 210, was produced by the hexadecimal data stream 221 shown in FIG. 5B. In the prior art, the two streams would be considered incompatible because the display manager adopting the RTASCII processing rules would consider the hexadecimal codes 81, 82, 83, 89, and 95 in the data stream 221 of the Japanese sentence 220 to be graphic codes, while the processor adopting the Shifted-JIS model would consider them to be control codes for shifting to another set of 256 code points, i.e., to another code page. Conversely, the Shifted-JIS rules would indicate that the code hexadecimal 8D in the data stream 211 of the English sentence 210 is a control code, i.e., a control page shifter, while the RTASCII rules would denote it to be a graphic code.

In this invention, the same display manager 28 interprets both data streams 211, 221 successfully because the display manager allows the font 40 to indicate which code points are graphic symbols 17 and which are control codes 15.

Figure 5A:
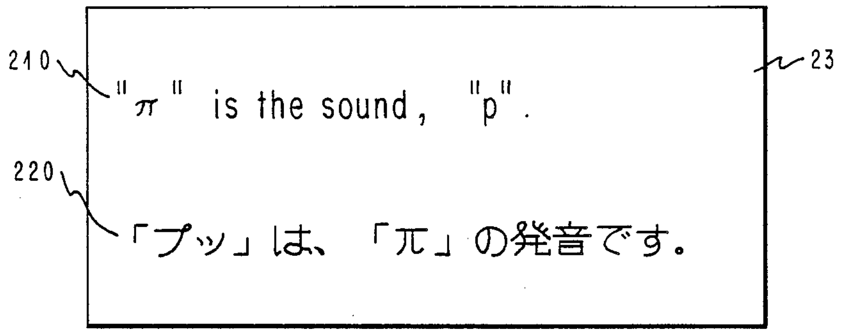
FIG. 5A shows a display with graphical symbols from two different languages expressed in two non-compatible syntaxes concurrently displayed.

For example, the display manager 28 would be using a RTASCII font 40 (FIG. 5C) to display the first sentence 210 (FIG. 5A). The display manager 28 would go to element hexadecimal 22 at element 281 of the index array 45. At that element 281, the control bits 250 would be set to zero, indicating that the value 260 would be taken as an offset 291 into the glyph structure 42. The display manager 28 would display the bit pattern 231 at that offset 291 and continue to process the next byte 202 of information in the data stream 211. The next reference is to element hexadecimal 1C, 282, of the index array 45. At that element 282, the index modifier bit 250 would be set to one, indicating that the control value 260 at element 282 is a control code called an index modifier 270. The control value 260 at this element 282 would not point into the glyph structure 42, but rather to another element 283 in the index array 45. This element 283 would represent the logical beginning of the desired code page 280 called "P2"0 in the preferred embodiment of this invention. The display manager 28 would process the next byte, hexadecimal 8D, in the data stream 211. This hexadecimal value 8D would be added to the logical beginning 283 of the correct code page 280 established by the previous control code 270 at element 282. At this element 284 of the array 45, the control bits 250 would be zero, indicating that the value 260 found there is not a modifier 270, but rather an offset 294 into the glyph table 42. The correct bit pattern 234 in the glyph table can then be accessed and the Greek "pi"0 character is displayed. The next hexadecimal code element 205 in the data stream 211 would cause the display manager to access the index array 45 at element 281 because each display of a character logically resets the code page pointer back to the beginning 1 of the index array 45. The remainder of the English sentence would be considered one-byte graphic code points because there are no other control codes, i.e., code page shifters, in the data stream.

The application sending the data stream to the display would then cause the working font to be changed to one that implements the Shifted-JIS model for the processing of the Japanese sentence. The first code byte 206 in data stream 221 which is hexadecimal 81, would cause the display manager 28 to access the index array 46 of the new font 43 (FIG. 5D) at element 286 which represents the hexadecimal byte 81. Unlike the RTASCII font, the Shifted-JIS indicates that this element is a control code by setting the index modifier bit 250 to one. The value 260 at this position 286 is therefore considered a modifier 270 which points to the section of the index array 46 that is the logical beginning of the desired code page 280. The next byte 207 shown as hexadecimal 75 in the data stream 221 would cause the display manager to access the index array 46 at the element 287 that is hexadecimal 75 positions from the logical beginning 2 of the code page pointed to by the modifier 270 at element 286. In this element 287, the control code 250 is set to zero, indicating that it contains an offset 260 into the glyph table 42. The bit pattern 237 found at this offset would be displayed, and the display manager 28 would consider that the sequence had terminated. Therefore, the display manager would logically reset the code page pointer to zero, or the beginning 1 of the index array 46. Processing of the remainder of the data stream for the Japanese sentence would continue in like manner.

Figure 5B:
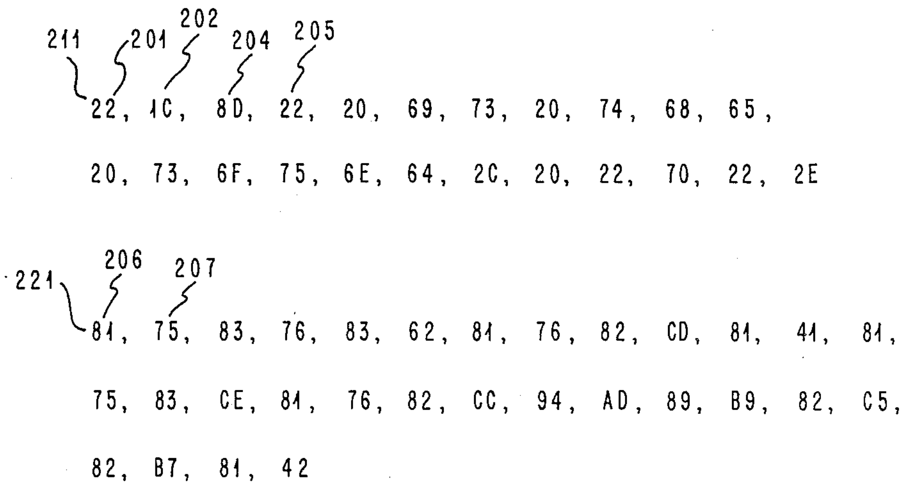
FIG. 5B illustrates the hexadecimal data streams for the display shown in FIG. 5A.
Figure 5C:
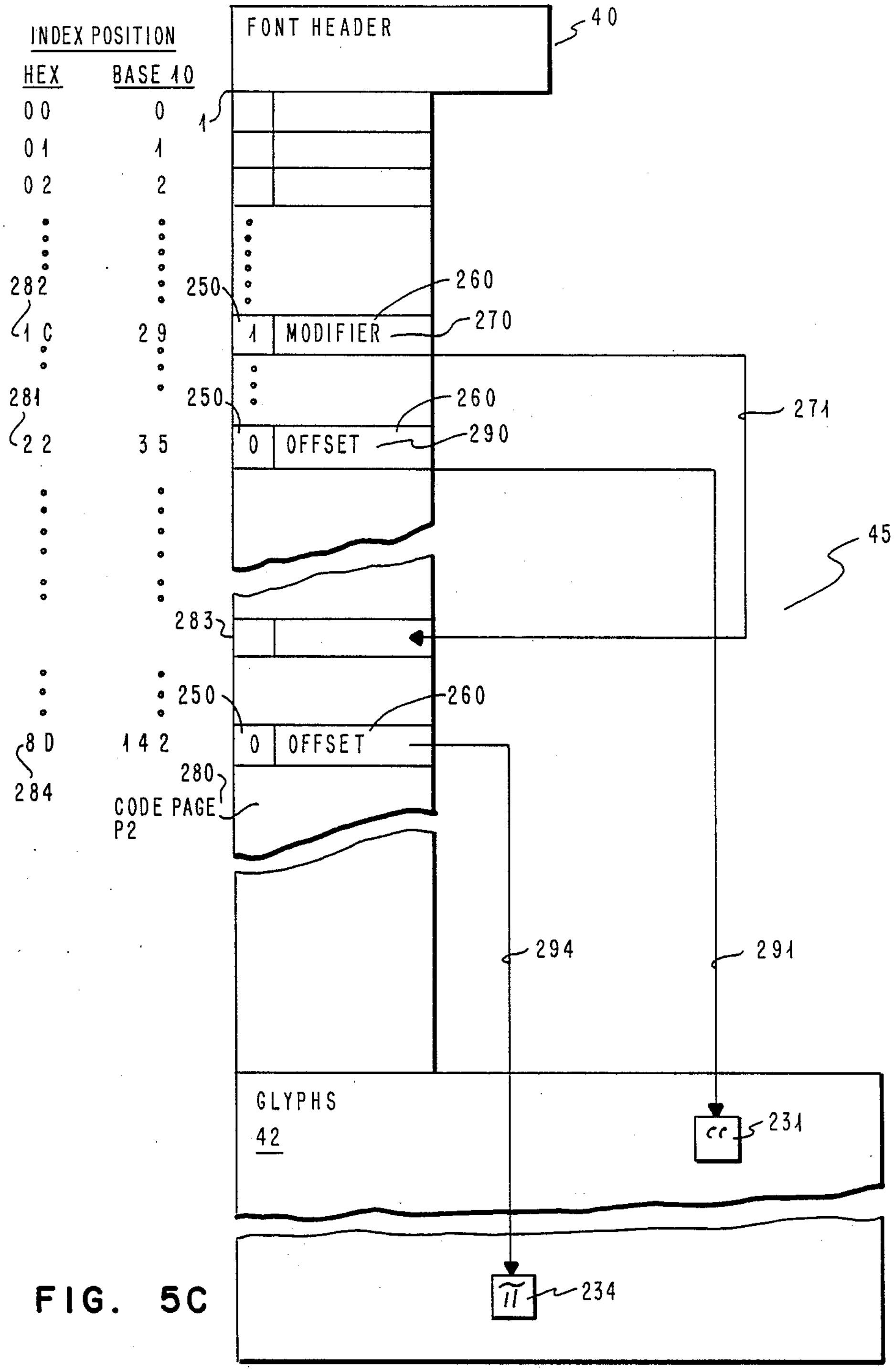
FIG. 5C illustrates a first processing model within a first font file.
Figure 5D:
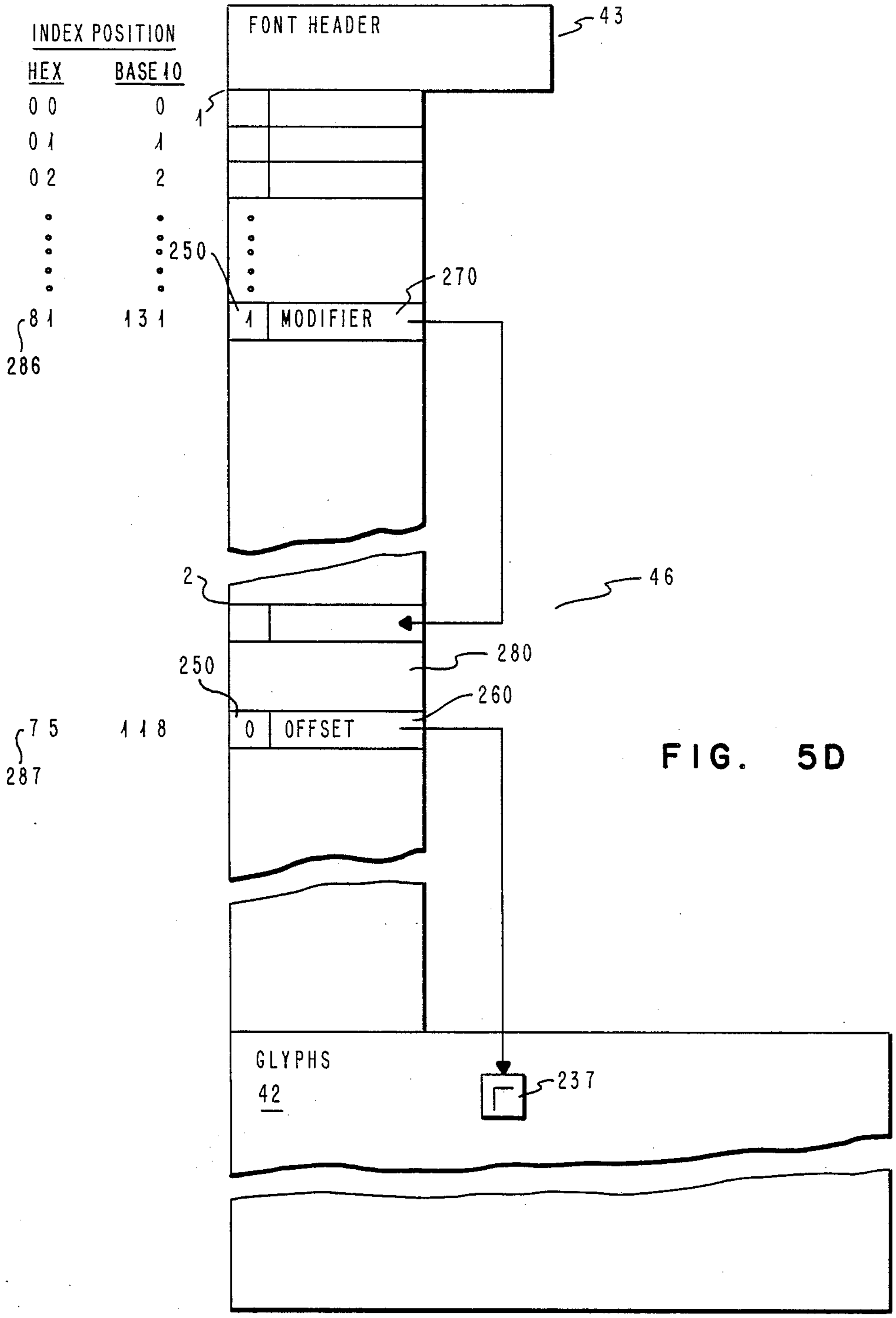
FIG. 5D illustrates a second processing model within a second font file.

The second data stream 221 shown in FIG. 5B would be found to be wholly "two-byte". That is, it would be considered to consist entirely of a byte of data which is a control code followed by a byte of data which is a graphic code. The example given above with reference to data stream 211 FIG. 5B is primarily a "single-byte"0 data stream, but does contain one two-byte sequence, namely "1C,8D"0 shown as elements 202, 204 in data stream 211. Using this invention, data streams can be mixed in any variation of "byte-lengths". Inspection of the data stream, itself, is not sufficient to determine the nature of the byte-length model being used. The control codes, code page shifters, are defined not in the programmed code of the display manager, but rather in the control bits of the index array of the font file supplied to the manager for display of the data stream.

As shown above, more than two bytes may be needed to display a graphical symbol if the range of graphical symbols available for display exceeds 65,535. For example, each one of the first 256 code points could each shift into a different one of 256 available code pages with each code page containing 256 displayable symbols. The first byte would represent a code page shifter, while the second byte would represent a graphical symbol within that code page.

Figure 6:
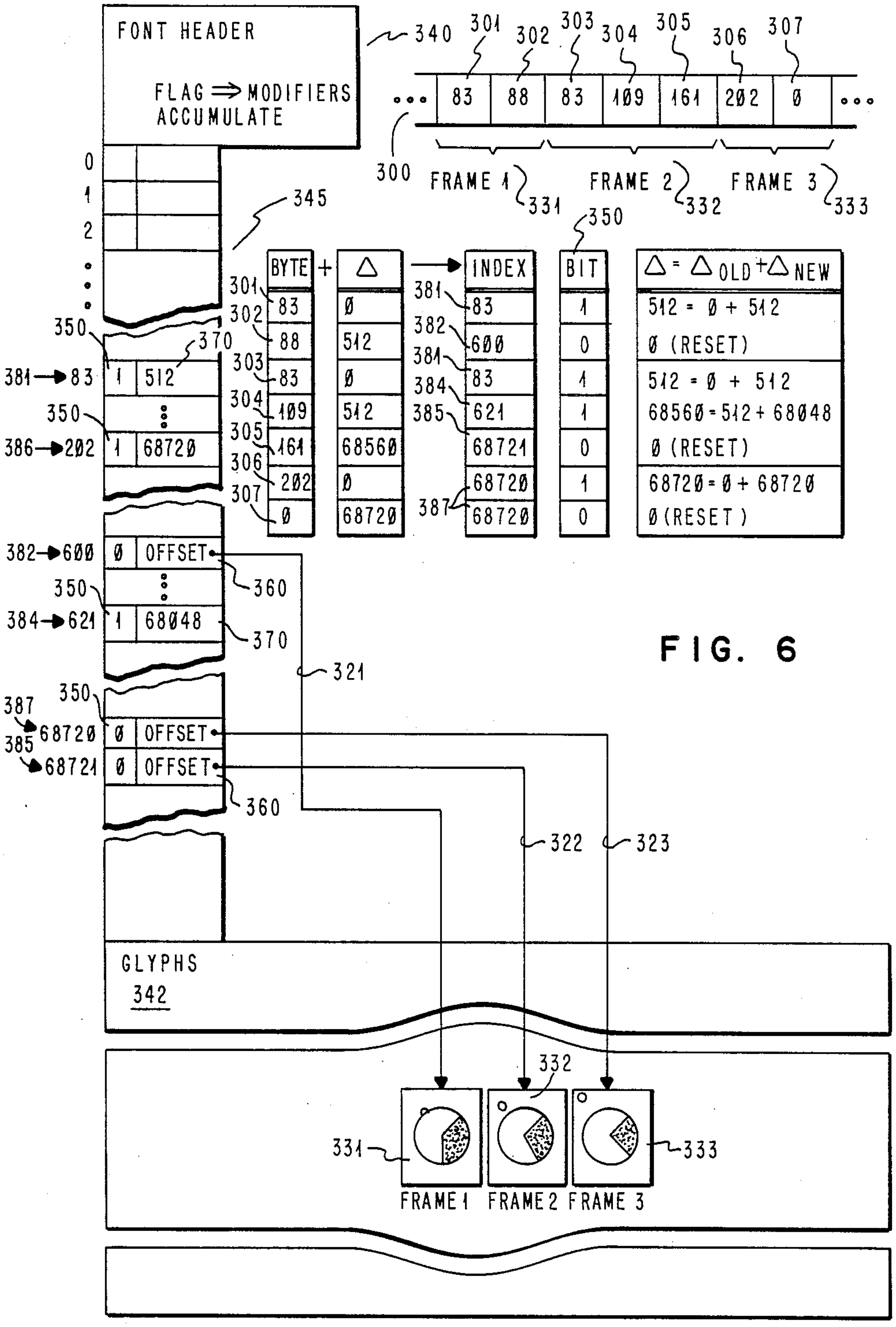
FIG. 6 illustrates the recursive ability of the processing model within the font file to access an endless number of graphical symbols.

Another preferred embodiment shown in FIG. 6 represents a data stream 300 that could be used to display animation frames. This example was chosen because the number of animation frames required for displaying animation could easily exceed 65,535 displayable symbols. When this occurs, more than two bytes are needed to specify a particular animation frame, i.e. graphical symbol. This example will show the bytes 301–307 in the data stream to be in a base ten format and not in hexadecimal as in the previous examples.

The first frame 331 is accessed by a two-byte nonrecursive specification. That is, the first byte 301 consisting of the value 83 is an index 381 into the array 345 that gives an index modifier 370 having a value of 512. The second byte 302 in the data stream 300 consisting of the value 88 plus the modifier 370 having a value of 512 gives an index of 600 at element 382 into index array 345 that is an offset 360 into the glyphs 342 comprising animation frames or graphical symbols.

The second frame 332 demonstrates recursive modifiers. The first byte 303 of the second frame 332 of data stream 300 having a value of 83 is once again an index 381 into the index array 345 that gives a modifier 370 having a value of 512. The second byte 304 of the second frame 332 of data stream 300 having a value of 109 plus the modifier 370 having a value of 512 gives an index of 621 at entry 384. Since the index modifier bit 250 is on, the control value 360 is also a modifier 370 having a value of 68048. The third byte 305 of the second frame 332 of data stream 300 having a value of 161 plus the value of the two modifiers at elements 381 and 384 gives an index entry of 68721 at entry 385 in the index array 345. The control code at this entry position 385 is zero and the value is an offset 360 into the glyphs 342. This implementation allows for the accumulation of modifiers. Another implementation could allow for the replacement of modifiers.

The third frame 333 shows what appears to be a simplistic method of access. The first byte 306 of the third frame 333 of data stream 300 having a value of 202 gives an index of 202 at entry 386 of the index array. The byte value is counted off from the beginning 1 of the index array 345 since the last byte was an offset into the glyphs and a graphical symbol was displayed. Since the index modifier bit 250 is on in element 386, the value 260 is an index modifier 270. The index modifier 370 has the value of 68720. The second byte 307 of the third frame 333 of data stream 300 has a value of 0. This value plus the value of the previous index modifier gives an entry 387 into the index array 345 at an index of 68720. The control bits 250 are off so the value 260 is an offset into the glyphs 342.

Note that a new two-byte sequence, 202,1, would give the same offset 322 into the glyphs 342 as does the three-byte sequence 83,109,161 used for the second frame 332. Although this would be inefficient in practice, it shows the flexibility of this invention.

While the invention has been particularly shown and described with reference to a preferred embodiment, it will be understood by those skilled in the art that various changes in form and detail may be made without departing from the spirit and scope of the invention.

By way of example only, and not limited to the following, the system and method of this invention is not limited to the presentation of graphic symbols on a display. As shown by FIG. 4, this invention is also applicable to the presentation of graphic symbols on printed output. By substituting a print manager 14 in place of the references to the display manager 28, and a printer 24, such as the IBM Proprinter, in place of the references to a display 23, this additional embodiment is described in sufficient detail to enable any person skilled in the art to make and use the same.

We claim:

1. A processing system for displaying graphical symbols from a data stream having a specific syntax comprising:
 a font file; and
 means for structuring said font file to incorporate a processing model of said data stream,
 wherein said font file is changeable by an application to incorporate a different processing model of a different data stream having a different syntax.

2. A processing system for displaying graphical symbols from a data stream having a specific syntax comprising:
 a font file; and
 means for structuring said font file to incorporate a processing model of said data stream,
 wherein said structured font file differentiates between a control code from said data stream and a graphical symbol code from said data stream.

3. The processing system of claim 2 wherein said graphical symbol code references an offset to a displayable graphical symbol.

4. The processing system of claim 2 wherein said control code references a modifier applicable to a next sequential byte in said data stream.

5. The processing system of claim 4 wherein said modifier shifts the next sequential byte through a range of displayable graphical symbols.

6. The processing system of claim 4 wherein the modifier is accumulative until an offset to a displayable graphical symbol is accessed.

7. The processing system of claim 2 wherein said control code is used recursively to access an unlimited member of said graphical symbols.

8. A processing system for displaying graphical symbols from a data stream comprising:
 a font file having means for incorporating the processing model of the data stream; and
 means for processing the data stream as directed by said font file,
 wherein said means for incorporating comprises means for structuring said font file.

9. The processing system of claim 8 wherein said structured font file differentiates a code for a graphical symbol from a control code.

10. A processing system for displaying graphical symbols from a data stream comprising:
 a font table containing said graphical symbols; and
 an index array to said font table incorporating the syntax of said data stream, said index array having an element for each one are of pf, a plurality of code points of said data stream,
 wherein said index array differentiates between control codes from said data stream and graphical symbol codes from said data stream.

11. The processing system of claim 10 wherein said index array differentiates through at least one control bit in each one of said elements of said index array.

12. The processing system of claim 11 wherein said at least one control bit is changeable by a user.

13. A font table comprising:
 means for displaying graphical symbols represented by a data stream; and
 means for interpreting the data stream,
 wherein said means for interpreting is changeable by a user.

14. A font table comprising:
 means for displaying graphical symbols represented by a data stream; and
 means for interpreting the data stream,
 wherein said means for interpreting is changeable by an application.

15. A font table comprising:
 means for displaying graphical symbols represented by a data stream; and
 means for interpreting the data stream,
 wherein said means for interpreting further comprises means for structuring an index to said font table to dynamically differentiate a control code from a graphic code.

16. A font comprising:
 means for defining a syntax of a data stream; and
 means for displaying graphical symbols represented by said data stream,
 wherein the syntax of the data stream is changeable by a user.

17. A font comprising:
 means for defining a syntax of a data stream; and
 means for displaying graphical symbols represented by said data stream,
 wherein the syntax of the data stream is changeable by an application.

18. A font comprising:
 means for defining a syntax of a data stream; and
 means for displaying graphical symbols represented by said data stream,
 wherein the means for defining is definable by a user.

19. A font comprising:
 means for defining a syntax of a data stream; and
 means for displaying graphical symbols represented by said data stream,
 wherein the means for defining is definable by an application.

20. A font comprising:
 means for defining a syntax of a data stream; and
 means for displaying graphical symbols represented by said data stream,
 wherein said means for defining comprises an array index for differentiating between a control code from said data stream and a graphical symbol code from said data stream.

21. The font of claim 20 wherein the length of the array index is variable.

22. The font of claim 21 wherein the length of the array index is dependent on the number of the graphical symbols and the syntax of a data stream.

23. The font of claim 20 wherein the graphical symbol code is an offset to a graphical symbol.

24. The font of claim 20 wherein the control code is an index modifier.

25. The font of claim 24 wherein said index modifier is used recursively to access an unlimited number of graphical symbols.

26. The font of claim 20 wherein the control code is a base modifier.

27. A processing system for printing graphical symbols from a data stream comprising:

a font file having means for incorporating the processing model of the data stream; and means for processing the data stream as directed by said font file, wherein said means for incorporating comprises means for structuring said font file.

28. The processing system of claim 27 wherein said structured font file differentiates a code for a graphical symbol from a control code.

29. A font table comprising:

means for printing graphical symbols represented by a data stream; and means for interpreting the data stream, wherein said means for interpreting is changeable by a user.

30. A font table comprising:

means for printing graphical symbols represented by a data stream; and means for interpreting the data stream, wheren said means for interpreting is changeable by an application.

31. A font table comprising:

means for printing graphical symbols represented by a data stream; and means for interpreting the data stream, wherein said means for interpreting further comprises means for structuring an index to said font table to dynamically differentiate a control code from a graphic code.

32. A processing system for displaying graphical symbols from a data stream having a specific syntax comprising:

a font file; and means for structuring said font file to incorporate a processing model of said data stream, wherein said means for structuring comprises means for generating an index to an index array from each one of a plurality of bytes in said data stream, and wherein said index array differentiates a control code in said index array from a graphical symbol in said index array.

* * * * *

UNITED STATES PATENT AND TRADEMARK OFFICE

CERTIFICATE OF CORRECTION

PATENT NO. : 4,987,550

DATED : January 22, 1991

INVENTOR(S) : Anne G. Leonard and Richard L. Verburg

It is certified that error appears in the above-identified patent and that said Letters Patent is hereby corrected as shown below:

Col. 15, line 47, please delete "member" and insert --number--.

Signed and Sealed this

Third Day of November, 1992

*Attest:*

DOUGLAS B. COMER

*Attesting Officer*

*Acting Commissioner of Patents and Trademarks*